(12) United States Patent
Xue

(10) Patent No.: US 8,988,478 B2
(45) Date of Patent: Mar. 24, 2015

(54) TERMINAL AND METHOD FOR PROMPTING SERVICE FAILURE IN THE VIDEO TELEPHONE SERVICE

(75) Inventor: Tao Xue, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 710 days.

(21) Appl. No.: 13/133,785

(22) PCT Filed: Aug. 19, 2009

(86) PCT No.: PCT/CN2009/073344
§ 371 (c)(1),
(2), (4) Date: Jun. 9, 2011

(87) PCT Pub. No.: WO2010/066139
PCT Pub. Date: Jun. 17, 2010

(65) Prior Publication Data
US 2011/0249082 A1    Oct. 13, 2011

(30) Foreign Application Priority Data

Dec. 9, 2008  (CN) .......................... 2008 1 0184006

(51) Int. Cl.
*H04N 7/14*     (2006.01)
*H04N 7/173*    (2011.01)
(Continued)

(52) U.S. Cl.
CPC ............... *H04N 7/147* (2013.01); *H04N 7/141* (2013.01); *H04M 1/72519* (2013.01);
(Continued)

(58) Field of Classification Search
CPC .................... H04M 1/72519; H04M 2201/50; H04M 2203/459; H04M 3/53308; H04M 3/543; H04N 21/42203; H04N 21/4223; H04N 21/442; H04N 21/4788; H04N 21/4882; H04N 21/64723; H04N 7/147; H04N 7/14; H04N 7/141; H04N 7/142; H04N 7/144; H04N 7/148; H04N 7/15; H04N 7/152; H04N 7/155; H04N 7/157
USPC .......... 348/14.01, 14.02, 14.03, 14.04, 14.05, 348/14.06, 14, 7, 14.08, 14.09, 14.1, 14.11, 348/14.12, 14.13, 14.14, 15.15, 14.16
See application file for complete search history.

(56) References Cited

U.S. PATENT DOCUMENTS 6,724,408 B1 *  4/2004  Chen et al. ..................... 715/853
2005/0251214 A1 * 11/2005 Parascandola et al. ........... 607/5
(Continued)

*Primary Examiner* — Khai N Nguyen
(74) *Attorney, Agent, or Firm* — McClure, Qualey & Rodack, LLP

(57) ABSTRACT

A terminal and a method for prompting service failure in the video telephone service are disclosed, and the terminal comprises a processing module, a storing module and a setting module which are connected orderly. Said terminal sets and stores the corresponding relationship between different failure prompt information and prompting modes according to the user's command, and when the terminal receives a video telephone call request and the called user performs the failure prompting operation, the terminal generates a call failure prompt message according to the preset failure prompt information and the prompting mode corresponding to said failure prompt information and sends it to the calling user. After the calling user terminal receives said call failure prompt message, it analyzes and acquires the failure prompt information and the corresponding prompting mode, and displays and/or plays the failure prompt information to the calling user according to the prompting mode.

18 Claims, 4 Drawing Sheets

(51) Int. Cl.
  *G06F 15/16* (2006.01)
  *H04M 1/725* (2006.01)
  *H04M 3/533* (2006.01)
  *H04M 3/54* (2006.01)
  *H04N 21/422* (2011.01)
  *H04N 21/4223* (2011.01)
  *H04N 21/442* (2011.01)
  *H04N 21/4788* (2011.01)
  *H04N 21/488* (2011.01)
  *H04N 21/647* (2011.01)

(52) U.S. Cl.
  CPC ......... *H04M 3/53308* (2013.01); *H04M 3/543* (2013.01); *H04M 2201/50* (2013.01); *H04M 2203/459* (2013.01); *H04N 21/42203* (2013.01); *H04N 21/4223* (2013.01); *H04N 21/442* (2013.01); *H04N 21/4788* (2013.01); *H04N 21/4882* (2013.01); *H04N 21/64723* (2013.01)
  USPC ................ 348/14.01; 348/14.12; 379/265.03; 455/414.1; 709/204

(56) References Cited

U.S. PATENT DOCUMENTS

2007/0288605 A1* 12/2007 Doraiswamy et al. ......... 709/220
2008/0309749 A1* 12/2008 Feng et al. ................. 348/14.01

* cited by examiner

TERMINAL AND METHOD FOR PROMPTING SERVICE FAILURE IN THE VIDEO TELEPHONE SERVICE

CROSS REFERENCE RELATED APPLICATIONS

This application is a national phase of PCT/CN2009/073344 filed Aug. 19, 2009 which claims priority to China Application Serial No. 200810184006.3, filed Dec. 9, 2008, both of which are entirely incorporated herein by reference.

TECHNICAL FIELD

The present invention relates to the field of communication technology, and more especially, to a terminal and a method for prompting service failure in the video telephone service.

BACKGROUND OF THE RELATED ART

The video telephone, belonging to the scope of multimedia communication, is a video conference system with wide application fields, and it makes peoples see the images of each other in a call, and it is not only suitable for family life, but also can be widely used in a variety of fields of different industries, such as business activities, distance education, security monitoring, hospital care, medical diagnosis, and scientific research, thus it has very broad market prospects.

As a end-to-end communication service, the video telephone service is similar to the original voice communication process, and during a call, there are possibly cases which can cause call failure, such as the called user being off, not in the service area or user being busy. During a traditional voice communication, a voice prompting is sent to the terminal user through the network side to notify the user of the call failure, and different voice prompts can be used to notify the user of reasons for failure, so as to improve the service and the satisfaction of the user using the service. Then, during a video call, the user should also need the similar prompting mode to notify the user of the reason for call failure. Thus, it is urgent to meet the users' this need during using the video telephone.

To date, the same voice promptings of call failure in the voice communication is used to notify the user in a video call. For example, the Chinese patent application (publication date is 2006 Jul. 12 and publication number is CN1801960A) whose application number is 200410011696.4. The Chinese patent application CN1801960A discloses a method for notifying service failing reason in picture phone service. The method contains step A, 3 G mobile switching center (MSC) judging whether calling is failing, if is, then identifying failing reason and executing step B: step B, 3G MSC transmitting said failing reason to failing reason playing net element: step C, failing reason playing net element determining correspondent audio video media stream file according to received failing reason proceeding negotiation with dialing user, utilizing established loading channel after negotiation to play said correspondent audio video media stream file to dialing user. The patent applicant CN1801960A needs to check the reason for call failure in the mobile switching center (MSC) and sends the reason for failure to the network element which plays the reason for failure, and the network element which plays the reason for failure searches the corresponding video and audio media files according to the reason for failure, and the network element which plays the reason for failure also needs to negotiate with the calling user about the playing capability, finally, according to the negotiation result, the audio and video media files corresponding to the reason for failure is played to the calling user.

The implementation of the above technical scheme of the patent applicant CN1801960A is very complicated, firstly, it needs to check the reason for call failure in the MSC; secondly, it needs to add a network element device which plays the reason for failure; thirdly, it needs to add the audio and video media files corresponding to all kinds of reasons for failure in the network element device which plays the failure; fourthly, it needs to negotiate with the calling user about the playing capability during playing, and the played audio and video files are relatively fixed and cannot be changed and modified frequently according to user's will.

SUMMARY OF THE INVENTION

The present invention offers a terminal and a method for prompting service failure in a video telephone service to solve the technical problem, thus it simplifies the process of prompting service failure in the video telephone service.

In order to solve the above technical problem, the present invention discloses a terminal for prompting service failure in the video telephone service, and the terminal comprises a processing module, a storing module and a setting module which are connected orderly, wherein:

said setting module is configured to set the corresponding relationship between all kinds of failure prompt information and the prompting modes according to the user's command;

said processing module is configured to search the prompting mode corresponding to the failure prompt information from the storing module according to the failure prompt information selected by the user during the failure prompting operation, and to generate a call failure prompt message carrying the failure prompt information and the prompting mode and send it to the other side;

said storing module is configured to store all kinds of failure prompt information and the prompting modes corresponding to the failure prompt information set by said setting module.

Furthermore, in the above said terminal, said processing module is also configured to generate said call failure prompt message according to the preset failure prompt information and the prompting mode corresponding to the failure prompt information if it does not receive any operation from the user in specified time after receiving the video telephone call request.

Furthermore, in the above terminal, said processing module is also configured to analyze the call failure prompt message received by said terminal, and to display and/or play the failure prompt information to the user according to the prompting mode in the call failure prompt message.

Wherein, said failure prompt information is the reason for video call failure.

Said prompting mode is one or any combination of the voice prompting mode, text prompting mode and video playing mode.

The present invention also discloses a method for prompting service failure in the video telephone service, and the method comprises:

the terminal sets and saves the corresponding relationship between all kinds of failure prompt information and the prompting modes according to the user's command, and when the called user terminal receives a video telephone call request and the called user performs the failure prompting operation, said called user terminal searches the prompting mode corresponding to the failure prompt information according to the failure prompt information selected by the called user, and generates a call failure prompt message carrying said failure prompt information and the prompting mode and sends it to the calling user.

Furthermore, in the above method, after said called user terminal receives said video telephone call request, it generates said call failure prompt message according to the preset failure prompt information and the prompting mode corresponding to the failure prompt information if the called user does not perform any operation in the specified time.

Furthermore, in the above method, after said calling user terminal receives said call failure prompt message, it analyzes said call failure prompt message to acquire the failure prompt information and the prompting mode, and displays and/or plays said failure prompt information to the calling user according to said prompting mode.

Wherein, said failure prompt information is the reason for video call failure.

Said prompting mode is one or any combination of voice prompting mode, text prompting mode and video playing mode.

According to the user needs, the technical scheme of the present invention sets different failure prompting mode for the video telephone service and simplifies the process of prompting service failure in the video telephone service.

PREFERRED EMBODIMENTS OF THE PRESENT INVENTION

The technical scheme of the present invention will be explained in further detail combining with the embodiments and accompanying figures below.

Figure 1:
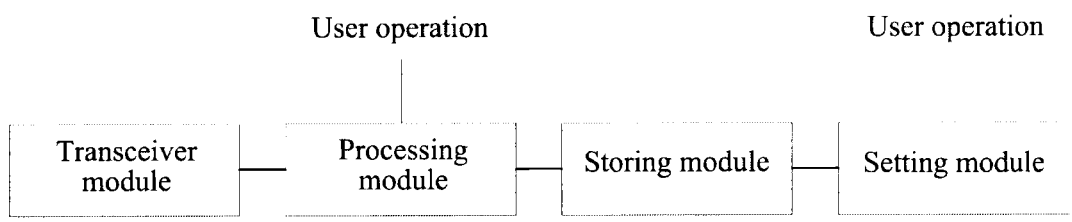
FIG. 1 is a schematic diagram of the structure of the terminal in accordance with the present invention.

A terminal for prompting service failure in the video telephone service, as shown in FIG. 1, comprises a transceiver module, a processing module, a storing module and a setting module which are connected orderly. In the following, the specific function of each module will be introduced.

The setting module is configured to display the failure prompt setting interface to the user, and to set different kinds of failure prompt information and the corresponding prompting modes according to the user's command, and to store all kinds of failure prompt information and the prompting modes corresponding to all kinds of failure prompt information in the storing module;

Wherein, the failure prompt information describes the reason for failure, such as "the user is busy" or "the user is in a conference", and the prompting mode can be one or any combination of voice prompting mode, text prompting mode or video playing mode, and the prompt information and prompting mode can be set at a time, and can also be modified according to the user needs.

The transceiver module is configured to receive and transmit the call failure prompt message and forward the call failure prompt message to the processing module;

wherein, the call failure prompt message can be Alerting message, Disconnect message or Release message defined in Q.931.

The processing module is configured to analyze the received call failure prompt message, and after extracting the failure prompt information and prompting mode, the extracted failure prompt information is displayed and/or played to the user according to prompting mode, and when the user performs failure prompting operation, the module is also configured to read the prompting mode corresponding to the failure prompt information from the storing module according to said failure prompt information selected by the user, and to generate a call failure prompt message according to the selected failure prompt information and the corresponding prompting mode which is read, and to call the transceiver module to send the call failure prompt message, and after the user receives a video telephone call request, the module also judges whether the user presets the failure prompt information if the processing module does not receive any operation from the user in the specified time, and if yes, read the prompting mode corresponding to the failure prompt information from the storing module and generate the call failure prompt message according to the failure prompt information and the prompting mode and call the transceiver module to send the call failure prompt message;

In other embodiments, after the user receives the video telephone call request, if the processing module does not receive any operation from the user in the specified time and judges that the user does not preset the failure prompt information, the processing module operates according to the existing procedure of processing the call failure, that is, the network side sends a call failure message to the calling user.

Wherein, when the call failure prompt message generated by the processing module is Alerting message, Disconnect message or Release message defined in Q.931, the failure prompt information and prompting mode is sent to the other side by the UUIE field.

The storing module is configured to store all kinds of failure prompt information set by the user and the prompting modes corresponding to all kinds of failure prompt information.

Figure 2:
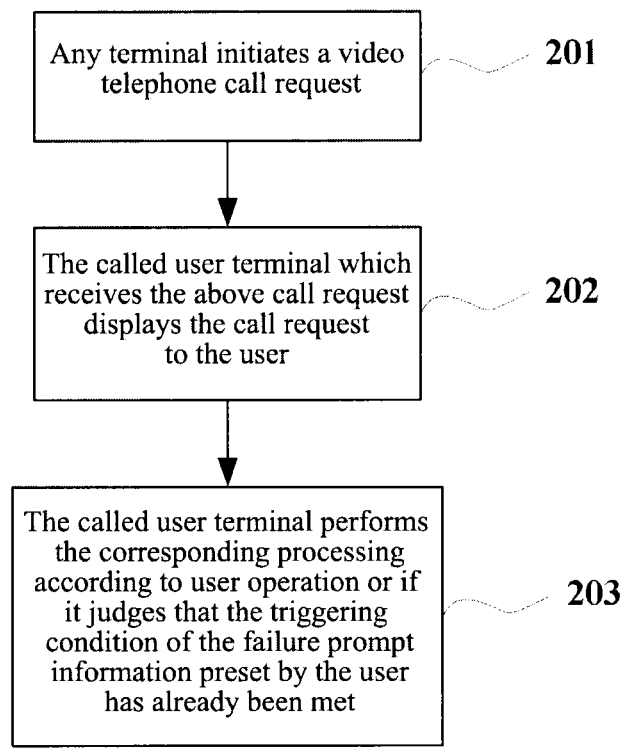
FIG. 2 is a flow chart of the terminal shown in FIG. 1 processing a video telephone call.

In the following, the process of processing a video telephone call after the above terminal presets all kinds of failure prompt information and the corresponding prompting modes according to the user command will be introduced, and as shown in FIG. 2, the process comprises the following steps:

Step 201: any terminal initiates a video telephone call request;

Step 202: the called user terminal which receives the above call request displays the call request to the called user; and Step 203: the called user terminal performs the corresponding processing according to the operation of the called user or if it judges that the triggering condition of the failure prompt information preset by the called user has already been met;

wherein, when the called user operates and establishes the call, the called user terminal performs the corresponding processing according to the prior art; when the called user selects a failure prompting operation, the called user terminal searches the prompting mode corresponding to the failure prompt information according to the failure prompt information selected by the called user, and generates a call failure prompt message carrying the prompt information and the prompting mode and sends it to the calling user terminal through the network side; when the called user terminal judges that the triggering condition of the failure prompt information preset by the called user has already been met, that is, when the called user dose not perform any operation in the specified time, the called user terminal judges that the failure prompt information at this time is "the user cannot answer the call", "the user is in a conference" or "the user is busy" according to the setting of the called user, and searches the prompting mode corresponding to the failure prompt information, and generates a call failure prompt message carrying the prompt information and the prompting mode, and sends the message to the calling user terminal through the network side.

Figure 3:
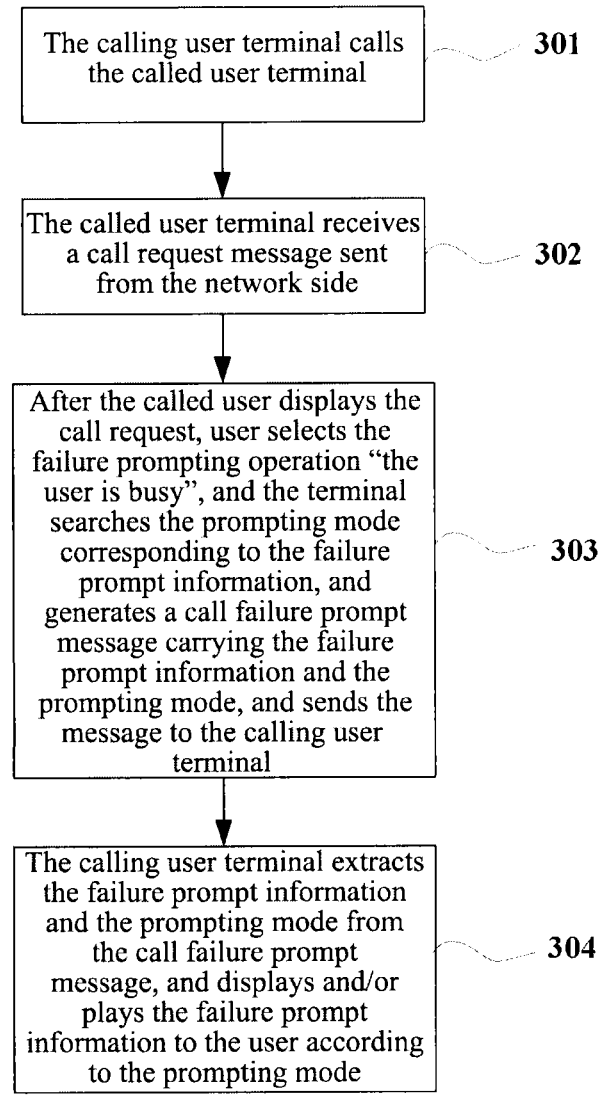
FIG. 3 is a flow chart of the terminal shown in FIG. 1 prompting the user that the called user is busy.

After the above called user terminal presets the failure prompt information as "the user is busy" and the corresponding prompting mode according to the called user's command, the process of prompting the failure in a video telephone service, as shown in FIG. 3, comprises the following steps:

Step 301: the calling user terminal calls the called user terminal by a video telephone;

Step 302: the called user terminal receives the call request message sent from the network side;

Step 303: after the called user terminal displays the call request to the called user, if the called user performs the failure prompting operation and selects the failure prompt information as "the user is busy", the terminal searches the prompting mode corresponding to the failure prompt information, and generates a call failure prompt message carrying the failure prompt information and the prompting mode, and sends the message to the calling user terminal through the network side; and Step 304: the calling user terminal extracts the failure prompt information and the prompting mode from the received call failure prompt message, and displays and/or plays the failure prompt information to the calling user according to the prompting mode, and the calling user selects to end the call or re-call.

Figure 4:
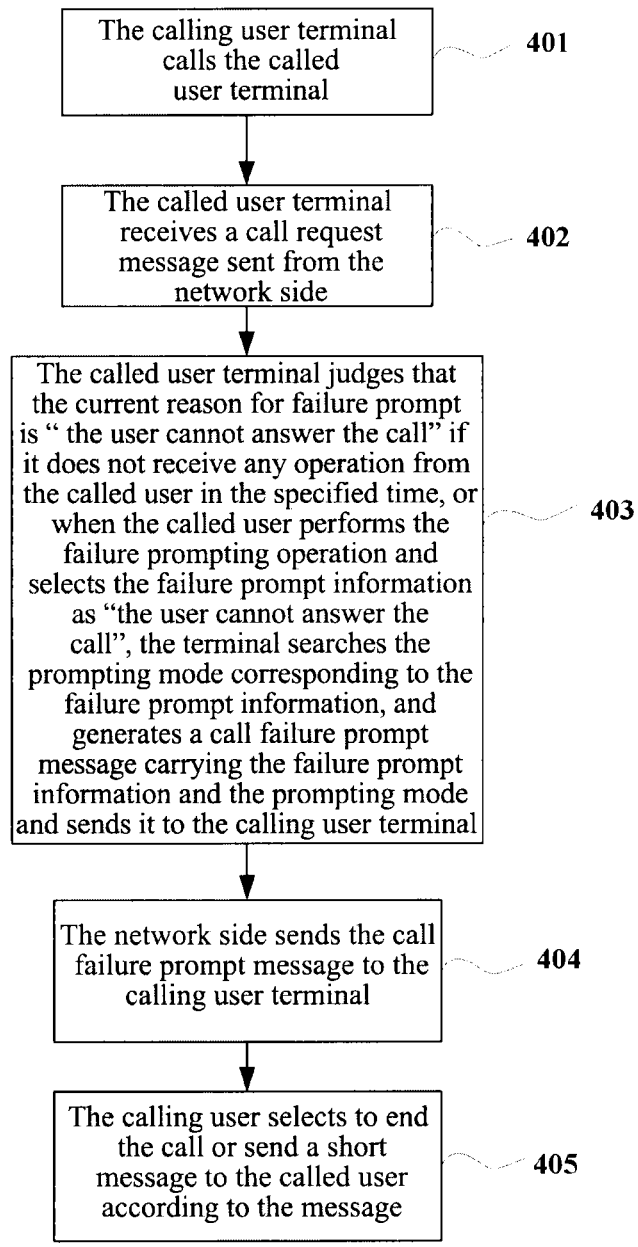
FIG. 4 is a flow chart of the terminal shown in FIG. 1 prompting the user that the called user cannot answer right now.

After the above called user presets failure prompt information as "the user cannot answer the call" and the corresponding prompting mode according to the called user's command, the process of prompting the failure in a video telephone service, as shown in FIG. 4, comprises the following steps:

Step 401: the calling user terminal calls the called user terminal by a video telephone;

Step 402: the called user terminal receives the call request message sent from the network side;

Step 403: the terminal judges that the current reason for failure prompt is "the user cannot answer the call" if the called user terminal does not receive any operation from the called user, or the called user performs failure prompt operation and selects the failure prompt information as "the user cannot answer the call", the terminal searches the prompting mode corresponding to the failure prompt information "the user cannot answer the call", and generates a call failure prompt message carrying the failure prompt information and the prompting mode and send it to the calling user terminal through the network side;

in this step, the called user presets that the called user terminal judges the current reason for failure prompt as "the user cannot answer the call" if there isn't any operation in the specified time after receiving the video telephone call request, of course in other embodiments, the called user can also preset that the terminal judge the current reason for failure prompt as "the user is busy" or "the user is in a conference" if no operation is received in the specified time after receiving the video telephone call request according to the calling user's own needs.

Step 404: the network side sends the call failure prompt message to the calling user terminal; and Step 405: the calling user selects to end the call or send a short message to the called user according to the received call failure prompt message.

Figure 5:
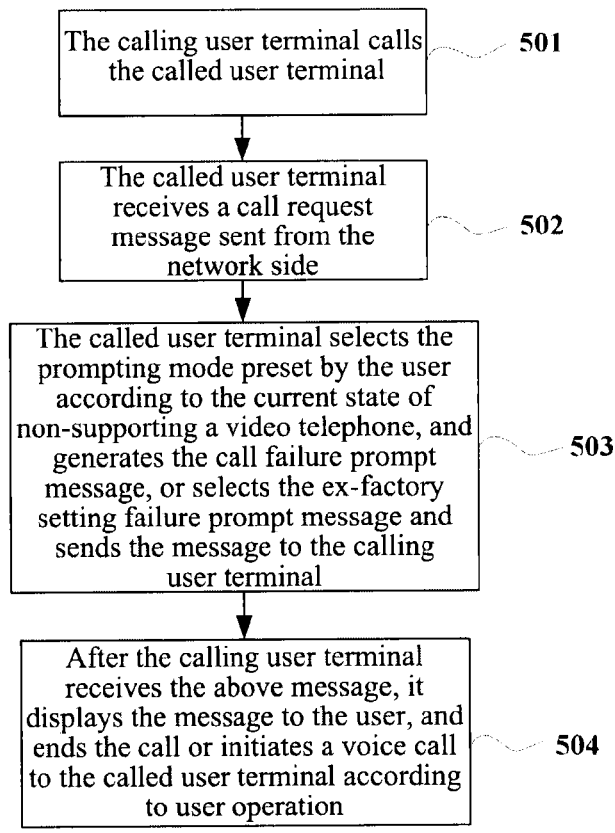
FIG. 5 is a flow chart of the terminal shown in FIG. 1 prompting the user that the called user does not support the video telephone.

When the called user does not support the video telephone in a call, the process of prompting the failure in the video telephone service, as shown in FIG. 5, comprises the following steps:

Step 501: the calling user terminal calls the called user terminal by a video telephone;

Step 502: the called user terminal receives the call request message sent from the network side;

Step 503: the called user terminal selects the prompting mode preset by the called user according to the current state of non-supporting a video telephone and generates the call failure prompt message, and sends the call failure prompt message to the calling user terminal through the network side;

In other embodiments, the prompting mode or call failure prompt message had already been set for the terminal when delivered from the factory, herein, the called user does not need to perform any setting in advance, that is, after the called user terminal receives the call request message of a video telephone, it automatically generates a call failure prompt message according to the ex-factory setting prompting mode, and sends the message to the calling user, or the called user terminal sends the ex-factory setting call failure prompt message to the calling user.

Step 504: after the calling user terminal receives the above call failure prompt message, it displays the message to the calling user, and ends the call or initiates a voice call to the called user terminal according to the operation of the calling user.

Figure 6:
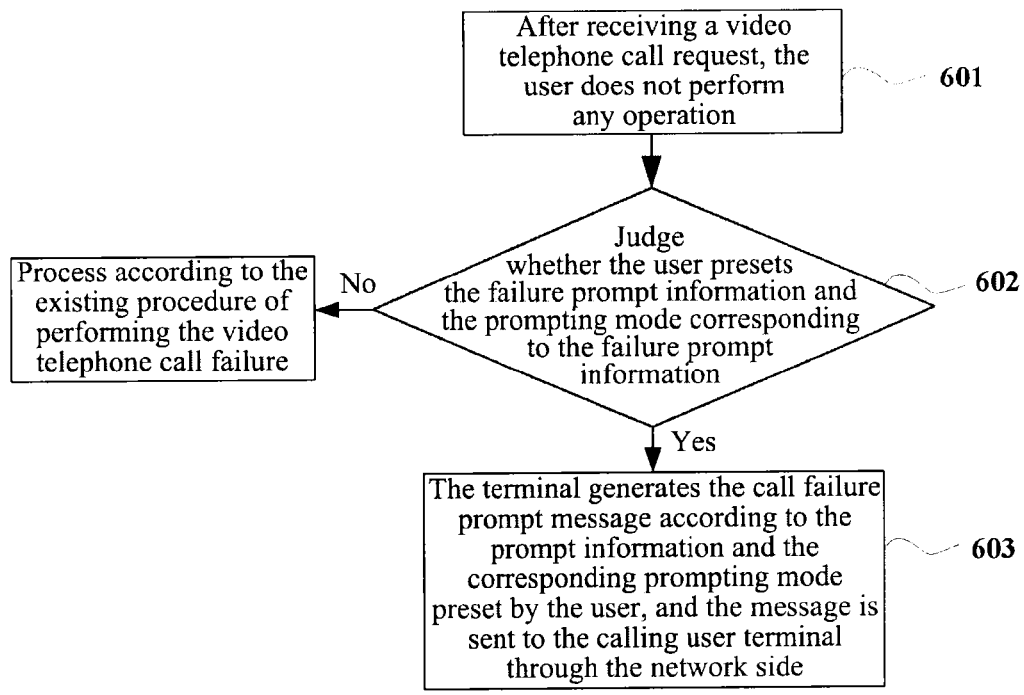
FIG. 6 is a processing flow chart of the user not performing any operation after the terminal shown in FIG. 1 receiving the video telephone call request.

After the above terminal receives the video telephone call request, the user does not perform any operation, the process is shown in FIG. 6, and the process comprises the following steps:

Step 601: after receiving the video telephone call request, the called user does not perform any operation;

Step 602: the called user terminal judges whether the called user presets the failure prompt information and the prompting mode corresponding to the failure prompt information, and if yes, proceed to step 603, otherwise, process according to the existing procedure for the video telephone call failure;

in this step, the existing procedure for processing the video telephone call failure is implemented by the network side.

Step 603: the called user terminal generates the call failure prompt message according to the prompt information and the corresponding prompting mode preset by the called user, and the call failure prompt message is sent to the calling user terminal through the network side.

Of course, the present invention may have other embodiments, and without departing from the spirit and essence of the present invention, those skilled in the art can make the corresponding different modifications or variations which should belong to the protection scope of the appended claims of the present invention.

INDUSTRIAL APPLICABILITY

On the premise of meeting the need of user personalization prompts, the technical scheme of the present invention simplifies the process of prompting the failure. Moreover, the technical scheme of the present invention also can be applied to different kinds of telephone terminals, and both fixed telephone terminal and mobile telephone terminal can easily achieve the function of prompting the reason for user failure in the video telephone service as long as they are supporting the video telephone function. Moreover, since the technical scheme of the present invention only modifies the user terminal suitably so that the terminal has the function of prompting service failure in the video telephone, thus the operators do not need to transform or update the switching device in the existing telephone network.

What is claimed is:

1. A terminal for prompting service failure in a video telephone service, and the terminal comprising a processing module, a storing module and a setting module which are connected orderly, wherein:
    said setting module is configured to set a corresponding relationship between a plurality of kinds of failure prompt informations and prompting modes according to a command of a user;
    said processing module is configured to search a prompting mode corresponding to a failure prompt information from said storing module according to the failure prompt information selected by said user during a failure prompting operation, and to generate a call failure prompt message including the failure prompt information and the prompting mode and send said call failure prompt message to a calling party of a video call, so that said call failure prompt message is sent from the terminal acted as a called party of the video call to the calling party of the video call without being processed by the network side;
    said storing module is configured to store the plurality of kinds of failure prompt informations and the prompting modes corresponding to the failure prompt informations set by said setting module.

2. The terminal of claim 1, wherein,
    said processing module is also configured to generate said call failure prompt message according to the preset failure prompt information and the prompting mode corresponding to said failure prompt information if no operation is received from the user in specified time after receiving a video telephone call request.

3. The terminal of claim 2, wherein
    said failure prompt information is a reason for video call failure.

4. The terminal of claim 3, wherein,
    said prompting mode is one or any combination of voice prompting mode, text prompting mode and video playing mode.

5. The terminal of claim 1, wherein,
    said processing module is also configured to analyze the call failure prompt message received by said terminal, and to display and/or play said failure prompt information to the user according to the prompting mode in the call failure prompt message.

6. The terminal of claim 5, wherein
    said failure prompt information is a reason for video call failure.

7. The terminal of claim 6, wherein,
    said prompting mode is one or any combination of voice prompting mode, text prompting mode and video playing mode.

8. The terminal of claim 1, wherein
    said failure prompt information is a reason for video call failure.

9. The terminal of claim 8, wherein,
    said prompting mode is one or any combination of voice prompting mode, text prompting mode and video playing mode.

10. A method for prompting service failure in a video telephone service, comprising:
    a terminal setting and saving a corresponding relationship between a plurality of kinds of failure prompt informations and prompting modes according to user's command, and when a called user terminal receives a video telephone call request and the called user performs a failure prompting operation;
    said called user terminal searching a prompting mode corresponding to a failure prompt information according to the failure prompt information selected by the called user; and
    generating a call failure prompt message including said failure prompt information and the prompting mode and sending said call failure prompt message to a calling user terminal, so that said call failure prompt message is sent from the called user terminal to the calling user terminal without being processed by the network side.

11. The method of claim 10, further comprising the following steps:
    after said called user terminal receives said video telephone call request, said called user terminal generating said call failure prompt message according to the preset failure prompt information and the prompting mode corresponding to said failure prompt information if the called user does not perform any operation in specified time.

12. The method of claim 11, wherein,
    said failure prompt information is a reason for video call failure.

13. The method of claim 12, wherein,
    said prompting mode is one or any combination of voice prompting mode, text prompting mode and video playing mode.

14. The method of claim 10, further comprising the following steps of:
    after receiving said call failure prompt message, said calling user terminal analyzing said call failure prompt message to acquire the failure prompt information and the prompting mode, and displaying and/or playing said failure prompt information to the calling user according to said prompting mode.

15. The method of claim 14, wherein,
    said failure prompt information is a reason for video call failure.

16. The method of claim 15, wherein,
    said prompting mode is one or any combination of voice prompting mode, text prompting mode and video playing mode.

17. The method of claim 10, wherein,
    said failure prompt information is a reason for video call failure.

18. The method of claim 17, wherein,
    said prompting mode is one or any combination of voice prompting mode, text prompting mode and video playing mode.

* * * * *